US008916233B2

(12) United States Patent
Mosse et al.

(10) Patent No.: US 8,916,233 B2
(45) Date of Patent: Dec. 23, 2014

(54) METHODS FOR COATING LENSES CURVED SURFACES WITH A POLARIZING LIQUID

(75) Inventors: Herbert Mosse, Lutz, FL (US); Richard Muisener, Tarpon Springs, FL (US)

(73) Assignee: Essilor International (Compagnie Generale d'Optique), Charenton-Le-Pont (FR)

( * ) Notice: Subject to any disclaimer, the term of this patent is extended or adjusted under 35 U.S.C. 154(b) by 2456 days.

(21) Appl. No.: 10/598,459

(22) PCT Filed: Mar. 1, 2005

(86) PCT No.: PCT/EP2005/002263
§ 371 (c)(1),
(2), (4) Date: Aug. 31, 2006

(87) PCT Pub. No.: WO2005/084826
PCT Pub. Date: Sep. 15, 2005

(65) Prior Publication Data
US 2007/0188698 A1 Aug. 16, 2007

Related U.S. Application Data

(60) Provisional application No. 60/549,512, filed on Mar. 2, 2004.

(51) Int. Cl.
*G02C 7/02* (2006.01)
*B29D 11/00* (2006.01)
*B05C 11/02* (2006.01)
*G02B 5/30* (2006.01)
*G02B 1/10* (2006.01)
*B05C 11/04* (2006.01)

(52) U.S. Cl.
CPC ............ *B05C 11/025* (2013.01); *G02B 5/3016* (2013.01); *B29D 11/00865* (2013.01); *G02B 1/10* (2013.01); *B05C 11/041* (2013.01); *Y10S 425/808* (2013.01)
USPC ........... 427/162; 264/1.32; 264/1.7; 425/110; 425/808

(58) Field of Classification Search
CPC ............... B05C 11/025; B05C 11/041; B29D 11/00865; G02B 5/3016; G02B 1/10
See application file for complete search history.

(56) References Cited

U.S. PATENT DOCUMENTS

| 2,400,877 | A | 5/1946 | Dreyer ......................... 359/491 |
| 4,211,823 | A | 7/1980 | Suzuki et al. ................. 428/412 |
| 4,648,925 | A | 3/1987 | Goepfert et al. .............. 156/153 |
| 4,683,153 | A | 7/1987 | Goepfer et al. .............. 428/1.31 |

(Continued)

FOREIGN PATENT DOCUMENTS

| EP | 0404111 | 12/1990 |
| GB | 185906 | * 9/1922 |

(Continued)

*Primary Examiner* — David Turocy
*Assistant Examiner* — Michael G Miller
(74) *Attorney, Agent, or Firm* — Fulbright & Jaworski LLP

(57) ABSTRACT

Methods and apparatuses for coating at least a portion of a curved surface of a lens with a polarizing liquid are disclosed throughout the specification. For example, there is provided a method comprising providing a lens having a curved surface, and applying a polarizing liquid to at least a portion of the curved surface by shear flow with a flexible apparatus. Other methods are included. Apparatuses include ophthalmic lenses having polarized coatings formed according to any of the disclosed methods.

37 Claims, 6 Drawing Sheets

(56) References Cited

U.S. PATENT DOCUMENTS

| | | | |
|---|---|---|---|
| 4,865,668 A | 9/1989 | Goepfert et al. | 156/74 |
| 4,977,028 A | 12/1990 | Goepfert et al. | 428/426 |
| 5,015,523 A | 5/1991 | Kawashima et al. | 428/336 |
| 5,316,791 A | 5/1994 | Farber et al. | 427/164 |
| 5,739,296 A | 4/1998 | Gvon et al. | 534/577 |
| 6,049,428 A * | 4/2000 | Khan et al. | 359/491 |
| 6,174,394 B1 | 1/2001 | Gvon et al. | 156/100 |
| 6,245,399 B1 | 6/2001 | Sahouani et al. | 428/1.31 |
| 2004/0145701 A1 * | 7/2004 | Miniutti et al. | 351/159 |

FOREIGN PATENT DOCUMENTS

| | | |
|---|---|---|
| JP | 63-87223 | 4/1988 |
| JP | 63-141001 | 6/1988 |
| WO | WO 94/10230 | 5/1994 |

* cited by examiner

METHODS FOR COATING LENSES CURVED SURFACES WITH A POLARIZING LIQUID

This application is a national phase application under 35 U.S.C. §371 of International Application No. PCT/EP2005/002263 filed 1 Mar. 2005, which claims priority to U.S. Provisional Application No. 60/549,512 filed 2 Mar. 2004. The entire text of each of the above-referenced disclosures is specifically incorporated herein by reference without disclaimer.

BACKGROUND OF THE INVENTION

A. Field of the Invention

The invention relates generally to methods of coating lenses. More particularly, the invention relates to methods of applying polarized coatings to curved lenses.

B. Description of Related Art

Polarized lenses block light of certain polarization states. By blocking horizontally polarized light, a polarized lens reduces glare that would otherwise exist through a non-polarized lens, such as glare off water, roads, and other objects. As a result of the reduced glare, objects become more distinct and true colors more clear. There are currently several different known systems for polarizing lenses for use in eyewear.

1. Film-Based Polarizing Systems

Certain of today's current eyewear products are fabricated by casting polyvinylalcohol-iodine films into a thermoset lens or by insert injection molding of a laminated polarized film to a thermoplastic lens. From a business perspective, these technologies are rigid and usually specific to mass production rather than made-to-order prescription ophthalmic lenses. The final optical properties of the resulting lens are determined by the film and are not easily altered. Additionally, film-based lenses require a separate inventory of polarized products, which can lead to increased costs.

Film-based products suffer from certain performance/technology shortcomings. Although the films have very high polarization efficiencies, the performance of the resulting lens is highly dependent upon the precise placement of the film within the lens. For example, if the polarization axis is not placed within three (3) degrees of the optic axis of a progress lens, the product is not acceptable. Also, a film placed on a progressive lens can greatly limit the final thickness of a wearer's lens due to the film's thickness. Furthermore, the precursor film to the polarization film can have cosmetic impurities/non-uniformities due to the nature of dying the polarization film (also known in the art as stretch films). Such non-uniformity, which can be observed as streaking in the film's coloration, can be exacerbated by the casting process, during which a thermal or chemical attack of the film can lead to dye bleach or further color non-uniformity.

2. Other Polarizing Systems

Example of lenses that have been polarized using a coating rather than film are shown in U.S. Pat. Nos. 4,648,925; 4,683,153; 4,865,668; and 4,977,028. Performance of the methods disclosed in these patents involves rubbing or scratching the lens prior to deposition of the dye used to form the coating. Such a process, commercially, is "dirty" and not readily adaptable or necessarily compatible with all lens materials and curvatures. To orient a dye molecule in these processes, the substrate must be scratched to form grooves of appropriate dimensions, which will in turn create a molecular orientation of the applied die that is favorable to alignment. The overall performance (contrast ratio=40) of such polarized lenses is relatively low. The scratching is also likely to induce some haze in the final product.

U.S. Pat. No. 2,400,877, discloses treating a substrate in some manner to produce an orientation that will, in turn, properly orient the polarizable materials that are applied to the substrate to form a polarized coating. Rubbing the surface of the substrate is disclosed as the preferred means of creating the appropriate surface orientation, although static electrical and magnetic fields are also disclosed for the same purpose. This patent mentions "spraying, flowing, pouring [and] brushing" as means of applying the disclosed films of polarizing materials to a surface. Dip coating is disclosed as one example of the disclosed application methods. Much of the patent is directed to describing means of fixing the applied polarized material, such as by controlling the evaporation and/or solidification of the film after it has been applied. The patent states that "[a]nother object of [the] invention is to provide polarizing films on curved and intricate surfaces and to provide films in any of unlimited colors and color combinations." The patent also recites treating "polarizing filters for optical work of various kinds including photography, binoculars, goggles, windshields, mirrors, etc. . . . [and] lenses corrected for chromatic aberration . . . ." The patent does not suggest coating a lens by shear flow with a flexible apparatus or otherwise coating a surface that is not first treated for orientation in some way. The patent also does not suggest utilizing shear flow alone in coating a surface with a polarizing liquid.

Two systems have recently been proposed to form polarized coatings on flat surfaces using shear. The Optiva systems disclosed in U.S. Pat. Nos. 5,739,296; 6,049,428; and 6,174,394 include a blend of three self-assembling lyotropic liquid crystal dyes that, upon application of shear, orient to form various colored polarizers. These patents mention the use of coating rods, slot-dye (extrusion) coating, coating by capillary forces, and other methods as ways of coating a flat surface with, for example, a polymeric film or glass sheets. Because the orientation of the molecules occurs during the coating process, no surface preparation steps, such as rubbing, are necessary. This reduces the need for a specific alignment layer or reduces the incompatibility of surfaces on which liquid crystalline materials are not likely to align during application. The processes in these patent are suited to web coating a continuous roll of thin, flat polymeric films. They are not suited to use on non-flat surfaces.

U.S. Pat. No. 6,245,399 discloses a liquid crystal guest-host system that is aligned by shear forces. In this patent, the dye is not directly aligned by the shear flow. Instead, the orientation of the guest dichroic (pleochroic) dye is controlled by the host lyotropic liquid crystal material, which is oriented by shear flow. This patent does not suggest any shear flow application for a non-planar surface.

SUMMARY OF THE INVENTION

The inventors have developed manners in which to apply polarizing liquids to curved surfaces, including those that have not previously been treated to create an orientation for the polarized coating, and thereafter form polarized coatings. A major benefit afforded by the present methods is that polarized coatings may now be created on made-to-order prescription lenses (e.g., ophthalmic lenses) in a short amount of time. As a result, custom lens makers may now create polarized coatings for their customers on demand, without needing to retain a separate inventory of polarized products.

The inventors provide apparatuses and methods for their use to coat curved substrates such as lenses with polarizing liquids.

According to the invention, there is provided a method for forming a polarized coating on a curved surface of a substrate which comprises:
(a) providing a substrate having a curved surface; and
(b) applying a polarizing liquid to at least a portion of the curved surface by shear flow with a flexible apparatus.

The substrate is generally placed in an holder preferably having an external curved surface surrounding the substrate curved surface. Preferably, the curvature of the holder external surface is matched to the curvature of the substrate curved surface so that the substrate curved surface and the surrounding external curved surface of the holder form a continuous curved surface.

Although the polarizing liquid may be disposed on the flexible apparatus prior to shear flow, it is preferably disposed on the holder external curved surface or on the substrate curved surface prior to shear flow and in a substantially straight line.

The flexible apparatus is preferably a flexible rod having a cylindrical, parallelepipedal or spherical flexible portion, and more preferably a cylindrical portion.

Also preferably, the external surface of the flexible rod is provided with a plurality of circonferantially spaced grooves. In a preferred embodiment, the grooves are formed by wrapping a toric around a flexible core, preferably of cylindrical shape.

The flexible apparatus may or may not be rotatable.

The substrate is preferably a lens, more preferably an ophthalmic lens and the curved surface thereof may already be coated with one or more functional coatings, such that an impact-resistant primer coating, an abrasion-resistant coating and an anti-reflective coating.

In a preferred embodiment, there is provided a method for forming a polarized coating on a curved surface of a substrate which comprises:
(a) providing a substrate having a curved surface;
(b) placing the substrate in a holder such that the substrate curved surface is freely accessible, said holder having an external surface surrounding the substrate curved surface;
(c) providing a flexible rod;
(d) depositing a polarizing liquid on an area of the holder external surface or of the substrate curved surface;
(e) applying the flexible rod on the holder external surface between its periphery and the deposited polarizing liquid so that the flexible rod matches the curvature of the holder external surface;
(f) moving the flexible rod past the deposited polarizing liquid and the substrate, whereby a film of the polarizing liquid is formed by shear flow on the substrate curved surface;
(g) drying the film of polarized liquid to form a polarizing coating; and
(h) recovering the substrate having a curved surface with a polarized coating thereon.

Preferably, the flexible rod is biased to apply a pressure force substantially normal to the holder and substrate curved surfaces during the entire moving step (f).

Preferably also, the external surface of the holder is a curved surface and more preferably a curved surface having the same curvature as the substrate curved surface so that the external surface of the holder and the substrate curved surface form a continuous curved surface.

The term "substantially" means at least approaching a given state (e.g., preferably within 10% of, more preferably within 1% of, even more preferably within 0.5% of, and most preferably identical to the given state).

The use of the word "a" or "an" when used in conjunction with the term "comprising" in the claims and/or the specification may mean "one," but it is also consistent with the meaning of "one or more," "at least one," and "one or more than one."

It is contemplated that any embodiment discussed in this specification can be implemented with respect to any method or apparatus of the invention, and vice versa. Furthermore, apparatuses of the invention can be used to achieve methods of the invention.

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings demonstrate certain aspects of the present methods. The drawings illustrate by way of example and not limitation, and they use like references to indicate similar, although not necessarily identical, elements.

DESCRIPTION OF ILLUSTRATIVE EMBODIMENTS

Although the description is made in connection with a lens, it should be understood that it can apply to any substrate having a curved surface.

Figure 1:
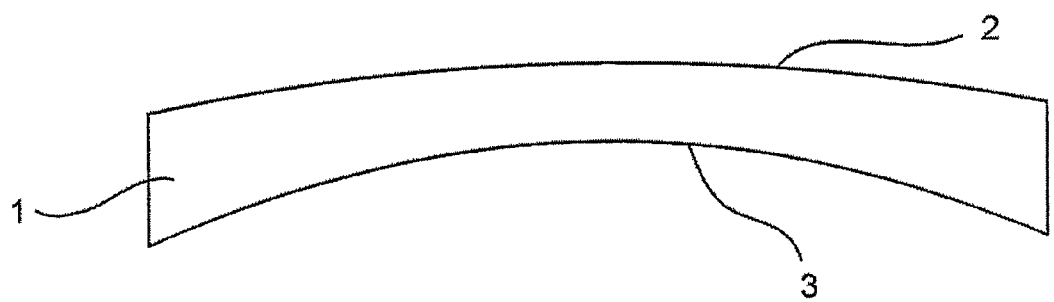
FIG. 1 is a side view of a lens having a curved surface.

FIG. 1 is a side view of a lens that can be coated with the methods and apparatuses of the present invention. The lens 1 includes curved surface 2 (which is a convex surface) and curved surface 3 (which is a concave surface), the two curved surfaces being oriented substantially opposite one another. The lens 1 may be an ophthalmic lens made from any suitable material, including mineral and organic glass polycarbonate.

Figure 2:
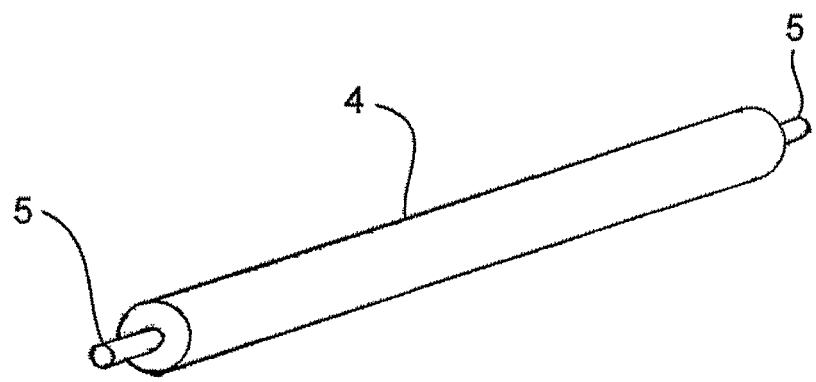
FIG. 2 is a perspective view of a flexible apparatus in an un-flexed state.
Figure 3:
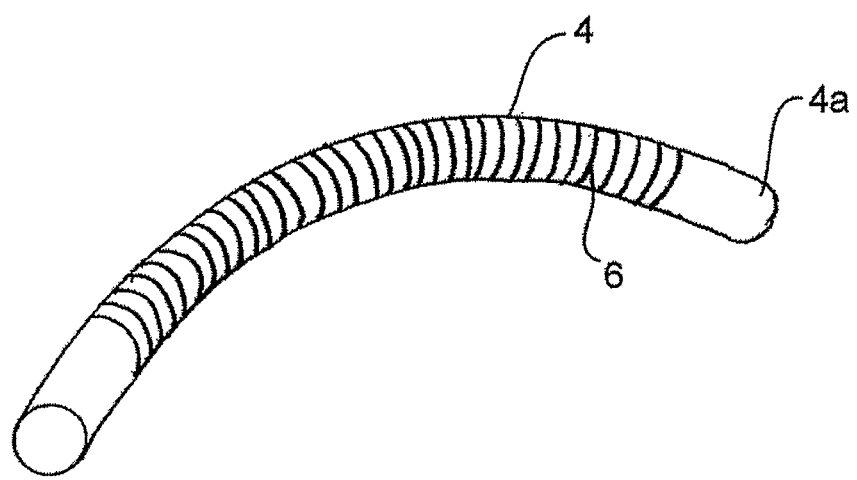
FIG. 3 is a perspective view of a flexible apparatus in a flexed state.

FIG. 2 shows a flexible apparatus 4 that is capable of being flexed in a variety of positions and angles. In non-limiting embodiments, for example, the flexible apparatus 4 can be flexed in a concave, convex, arcuate, and/or a circular manner. In more particular aspects of the invention, the flexible apparatus can be flexed in a concave shape that substantially matches the convex surface 2 of a lens 1 such as an ophthalmic lens. In particular embodiments, the flexible apparatus 4 can include a male connector 5 that can be configured to connect to a holding jig which can be configured to hold the flexible apparatus 4. In other embodiments, the connector can be a female connector. As shown in FIG. 3, in certain aspects, the flexible apparatus 4 does not include a connector.

FIG. 3 shows a flexible apparatus 4 that is in a flexed position. The illustrated embodiment includes a wire 6 that is wrapped around a cylindrical core 4a of the flexible apparatus 4. The wire 6 can be used, for example, to orient or align a polarizing liquid that is disposed on a lens 1 (or on a lens holder).

Typically, the cylindrical core 4a has a length of about 170 mm and a diameter of about 10 mm or less. The wire 6 has a diameter of about 150 μm or less and is preferably tightly helically wound on the central portion of the cylindrical core 4a. Wire coils shall be spaced as close as possible, but spacing needs not to be even.

Figure 4:
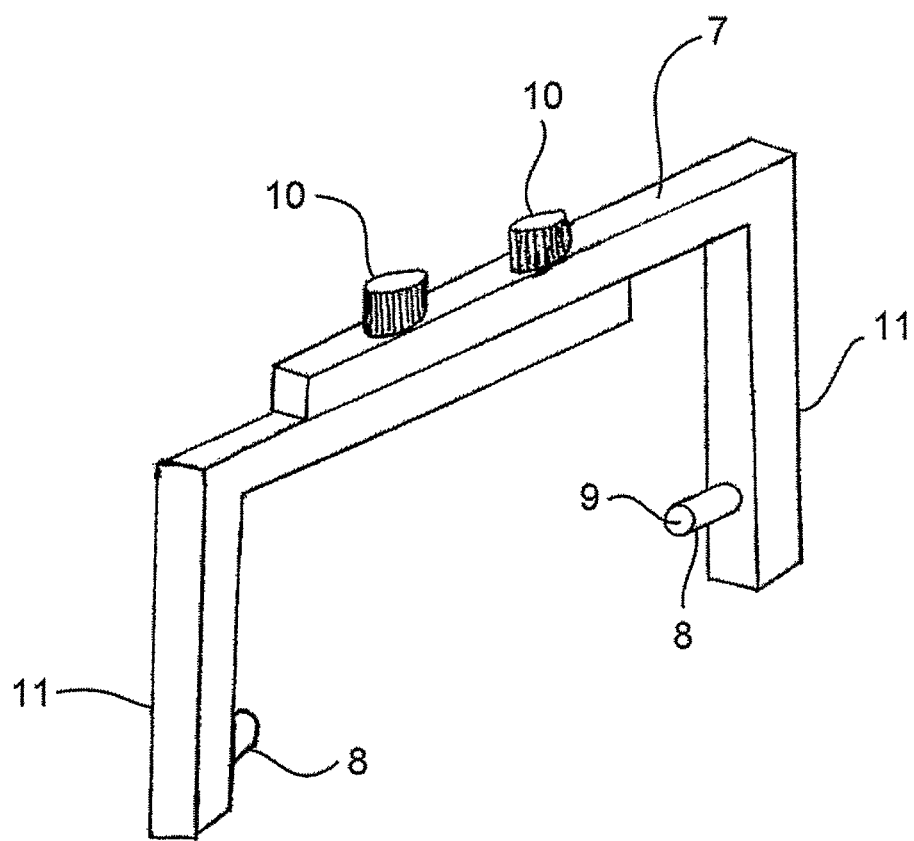
FIG. 4 is a perspective view of a holding apparatus that is configured to hold the flexible apparatus in FIG. 2 or FIG. 3.

FIG. 4 shows a holding jig 7 that can be configured to hold a flexible apparatus 4. The holding jig 7 can include a branch 8 that can be configured to accept a flexible apparatus 4. The branch 8 can include an inlet 9. In the illustrated embodiment, the inlet 9 is configured to accept the flexible apparatus 4 shown in FIG. 2. The inlet 9, however, can be configured to accept a flexible apparatus having a variety of shapes. Non-limiting examples of shapes can include, for example, circular, rectangular, spherical, oval, or triangular shapes. In other embodiments, the holding jig 7 can include knobs 10. The knobs 10 can be used, for example, to adjust the length of the holding jig 7, thereby allowing the holding jig 7 to accept flexible apparatuses having varying shapes and/or varying lengths. In other non-limiting embodiments, the holding jig 7 can be adjusted by pulling the ends 11 of the holding jig 7 apart or pushing the ends 11 together to lengthen or shorten the length of the holding jig 7.

In other non limiting embodiments, the holding jig 7 does not include branches 8. Rather, the holding jig 7 can be configured to accepts a flexible apparatus 4 by any suitable means known to those of skill in the art. An example includes recesses in the holding jig 7 that are configured to accept the ends of the flexible apparatus 4.

Figure 5:
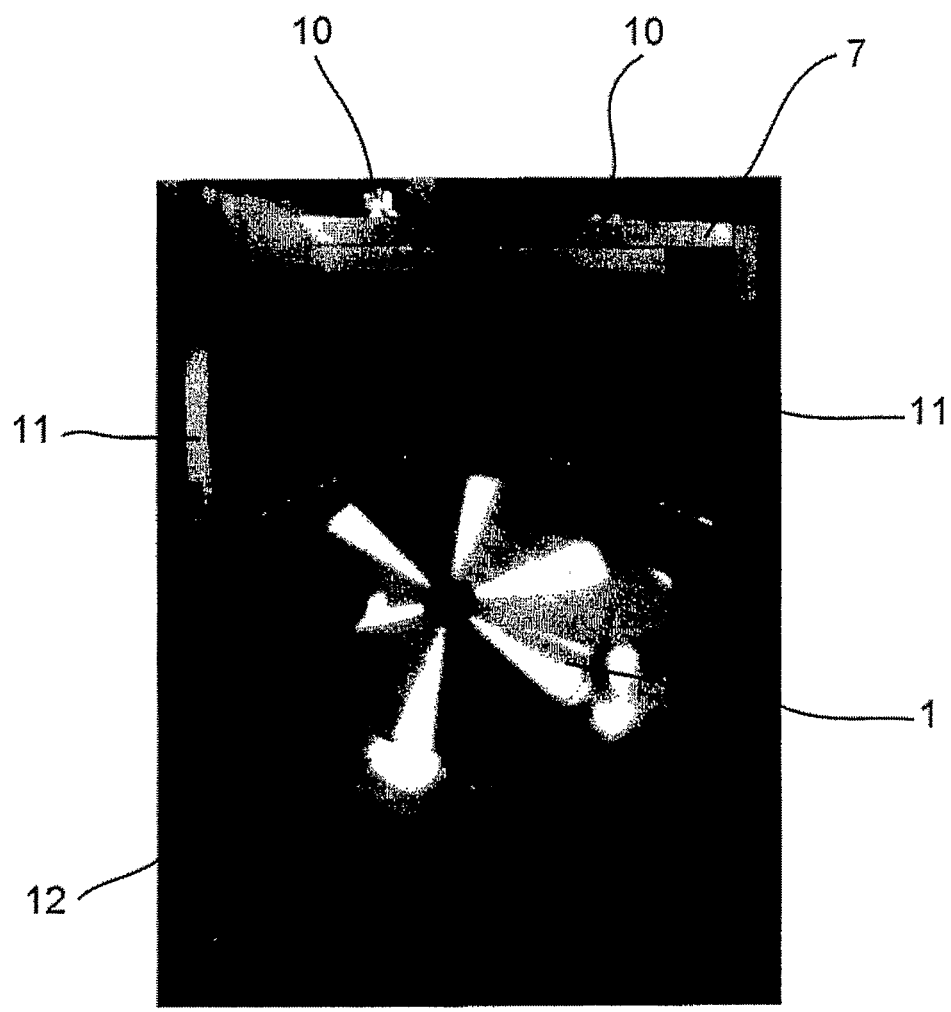
FIG. 5 is a non-limiting embodiment of the present invention.

FIG. 5 shows a non-limiting embodiment of the present invention. The flexible apparatus 4 is positioned in the inlet 9 of the holding jig 7. The lens 1 is placed on a lens holder 12. In other embodiments, the lens 1 can be attached or engaged to the lens holder 12 by any suitable means, including, for example, by an adhesive, by one or more notches in the lens holder 12, by vacuum suction cups, by one or more spring-loaded clamps, or by an interlocking collar between the lens 1 and the lens holder 12. Other suitable means known to those skilled in the art may also be used to hold the lens 1 or used to attach the lens 1 to the lens holder 12 illustrated in FIG. 5 or any other suitable lens holder.

A "polarizing liquid" is any solution configured to form a polarized coating at some time after application to a lens. Polarizing liquids include, but are not limited to, polarizing systems known to form a polarized coating as a result of shear flow of the liquid over a surface. Examples of suitable polarizing liquids include lyotropic liquid crystal materials, such as those disclosed in U.S. Pat. No. 6,049,428, in which the liquid crystal can be the active dye or a host in a guest-host system. One suitable polarizing liquid may be an aqueous suspension of dyes in which the color of the resulting polarized coating can be easily adjusted.

A polarized coating that may be described as a thin crystal film (TCF) polarized coating can be formed as follows. Existing dichroic dyes, that are also lyotropic liquid crystals, may be chemically modified by sulfonation. This modification will render the dye molecules amphiphilic. Both the amphiphilic nature and flat geometry of the dye molecules will lead to a self assembly, or stacking, of the dye molecules in solution, which may also be described as the polarizing liquid. The concentration of the solution will influence the structure of the resulting coating based upon the material's liquid crystal phase diagram.

The solution may be applied to a surface and sheared. The dye molecules will be aggregates in solution that will easily align through cooperative motion upon application of shear. The solution may then be cured to yield a polarized coating by drying the solution in a controlled manner. By this, the inventors mean that if the solution is dried too quickly, the water in the solution would effectively boil off, thus disrupting the structure of any resulting coating. In this same regard, if the solution is dried too slowly, the molecules in the solution that otherwise exist at a concentration and temperature range will experience an undesirable concentration change. If a moderate pace of drying is used, the orientation of the molecules in the solution will be locked in, and the molecules will not have time to reorganize into a different orientation. Exemplary drying conditions suitable for use in performance of the present methods are provided below in the examples. After such drying, the polarized coating may be set by making an insoluble salt.

TCF polarizing liquids (which form TCF polarized coatings and which may be referred to as TCF polarizers) offer advantages over polyvinylalcohol (PVOH) or PVOH-clad polarizers, including advantages in the following categories: haze: because a TCF polarizer is a single component, unlike a dispersed dye in a polymer, there is little or no scattering of light; viewing angle: in liquid crystal display (LCD) applications, TCF polarizers provide wider viewing angles than conventional polarizers. This aspect may be particularly useful in sunwear applications; thickness: TCF polarized coatings can be less than a micron in thickness, versus clad polarized coatings, which are typically at least 0.2 millimeters (mm) in thickness; and temperature stability: unlike conventional iodine/PVOH polarized coatings, TCF polarized coatings are stable in high humidity and temperatures exceeding 200° C. TCF polarizers may also be customized by color to best suit a given application.

A result of the methods disclosed throughout the specification and claims can be a polarized lens formed from a polarizing liquid that is capable of linear orientation under shear flow. The flexible apparatus described throughout provides a suitable means of inducing shear flow (e.g., through a linear shear field) across at least a portion of (and more preferably the entirety of) the exposed surface of the subject lens. Any dye(s) in the polarizing liquid can be adjusted to customize the color of the polarized coating. A polarized coating thickness of between 300 and 5000 nanometers (nm)

may be produced using 2-3 milliliters (mL) of polarizing liquid for a lens that is approximately 70 millimeters (mm) in diameter.

Prior to applying the polarizing liquid to a lens, one or more adhesion primer layers, which may comprise one or more coupling agents, may be deposited on the curved surface (or the portion of the curved surface) of the lens that is coated with the polarizing liquid as detailed above. Thus, all descriptions of coating a lens or a portion of lens encompass coating both the lens surface directly (e.g., no intervening coating between the lens surface and the polarizing liquid) and indirectly (e.g., an intervening coating—such as an adhesion layer—exists between the lens surface and the polarizing liquid).

A primer coating that is used for adhesion also may be used for improving the impact resistance of a finished optical article. Typical primer coatings are (meth)acrylic based coatings and polyurethane based coatings. (Meth)acrylic based coatings are, among others, disclosed in U.S. Pat. No. 5,015,523 (which is expressly incorporated by reference), whereas thermoplastic and crosslinked based polyurethane resin coatings are disclosed, inter alia, in Japanese Patents 63-141001 and 63-87223, EP0 404 111, and U.S. Pat. No. 5,316,791 (which is expressly incorporated by reference).

In particular, a primer coating suited for use with embodiments of the present methods can be made from a latex composition such as a poly(meth)acrylic latex, a polyurethane latex or a polyester latex. Among the preferred (meth)acrylic based primer coating compositions are polyethyleneglycol(meth)acrylate based compositions such as, for example, tetraethyleneglycoldiacrylate, polyethyleneglycol (200) diacrylate, polyethyleneglycol (400) diacrylate, polyethyleneglycol (600) di(meth)acrylate, as well as urethane (meth)acrylates and mixtures thereof. Preferably, a primer coating suited for use with the present methods has a glass transition temperature (Tg) of less than 30° C.

Among the preferred primer coating compositions are the acrylic latex commercialized under the name ACRYLIC LATEX A-639 (commercialized by ZENECA) and polyurethane latex commercialized under the names of W-240 and W-234 by BAXENDEN.

In a preferred embodiment, a suitable primer coating also may include an effective amount of a coupling agent in order to promote adhesion of the primer coating to the optical substrate and/or to the polarizing layer.

A primer coating composition can be applied using any classical method such as spin, dip, or flow coating. Depending upon the nature of the adhesive and impact-resistant primer coating composition, thermal curing, UV-curing or a combination of both can be used to cure the coating.

The thickness of a primer coating useful with the present methods, after curing, typically ranges from 0.05 to 20 micrometers (μm), preferably 0.5 to 10 μm and more preferably from 0.6 to 6 μm.

A suitable coupling agent may be a pre-condensed solution of an epoxyalkoxysilane and an unsaturated alkoxysilane, preferably comprising a terminal ethylenic double bond. Examples of epoxyalkoxysilanes are γ-glycidoxypropyltermethoxysilane, γ-glycidoxypropylpentamethyldisiloxane, γ-glycidoxypropylmethyldiisopropenoxysilane, (γ-glycidoxypropyl)-methyldiethoxysilane, γ-glycidoxypropylmethylethoxysilane, γ-glycidoxypropyldiisopropylethoxysilane and (γ-glycidoxypropyl)bis(trimethylsiloxy)methylsilane. The preferred epoxyalkoxysilane is (γ-glycidoxypropyl)trimethoxysilane.

The unsaturated alkoxysilane can be a vinylsilane, an allylsilane, an acrylic silane or a methacrylic silane. Examples of vinylsilanes are vinyltri(2-methoxyethoxy)silane, vinyltrisisobutoxysilane, vinyltri-t-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyldiacetoxysilane, vinylbis(trimethylsiloxy)silane and vinyldimethoxyethoxysilane. Examples of allylsilanes are allyltrimethoxysilane, alkyltriethoxysilane and allyltris(trimethylsiloxy)silane.

Examples of acrylic silanes are 3-acryloxypropyltris (trimethylsiloxy)silane, 3-acryloxypropyltrimethoxysilane, acryloxypropylmethyldimethoxysilane, 3-acryloxypropylmethylbis(trimethylsiloxy)silane, 3-acryloxypropyldimethylmethoxysilane, n-(3-acryloxy-2-hydroxypropyl)-3-aminopropyltriethoxysilane.

Examples of methacrylic silanes are 3-methacryloxypropyltris (vinyldimethoxysiloxy)silane, 3-methacryloxypropyltris (trimethylsiloxy)silane, 3-methacryloxypropyltris (methoxyethoxy)silane, 3-metacryloxypropyltrimethoxysilane, 3-methacryloxypropylpentamethyl disiloxane, 3-methacryloxypropylmethyldimethoxysilane, 3-methacryloxpropylmethyldiethoxysilane, 3-methacryloxypropyldimethyl methoxysilane, 3-methacryloxypropyldimethylethoxysilane, 3-methacryloxypropenyltrimethoxysilane and 3-methacryloxypropylbis (trimethylsiloxy)methylsilane. A preferred silane is acryloxypropyltrimethoxysilane.

Preferably, the amounts of epoxyalkoxysilane(s) and unsaturated alkoxysiolane(s) used for a coupling agent preparation are such that the weight ratio:

$$R = \frac{\text{weight of epoxyalkoxysilane}}{\text{weight of unsaturated alkoxysilane}}$$

verifies the condition 0.8≤R≤1.2.

A suitable coupling agent preferably comprises at least 50% by weight of solid material from the epoxyalkoxysilane(s) and unsaturated alkoxysilane(s) and more preferably at least 60% by weight. A suitable coupling agent preferably comprises less than 40% by weight of liquid water and/or organic solvent, more preferably less than 35% by weight.

The expression "weight of solid material from the epoxyalkoxysilanes and unsaturated alkoxysilanes" means the theoretical dry extract from those silanes that is the calculated weight of unit $Q_k Si O_{(4-K)/2}$, where:

$Q_k Si O_{(4-K)/2}$ comes from $Q_k Si R'O_{(4-k)}$;
Si R' reacts to form Si OH on hydrolysis;
K is an integer from 1 to 3 and is preferably equal to 1; and
R' is preferably an alkoxy group such as $OCH_3$.

The water and organic solvents referred to above come from those that have been initially added in the coupling agent composition and the water and alcohol resulting from the hydrolysis and condensation of the alkoxysilanes present in the coupling agent composition. Typically, the amount of coupling agent introduced in the primer coating composition represents 0.1 to 15% by weight of the total composition weight, preferably 1 to 10% by weight.

Preferred preparation methods for the coupling agent comprise: mixing the alkoxysilanes; hydrolysing the alkoxysilanes, preferably by addition of an acid, such as hydrochloric acid; stirring the mixture; optionally adding an organic solvent; adding one or several catalyst(s) such as aluminum acetylacetonate; and stirring (typical duration: overnight).

Furthermore, additional coatings—such as primer coatings and/or hard coatings—may be applied to a given lens on top of a polarized coating, provided that the different coatings are chemically compatible.

Preferred scratch-resistant coatings are those made by curing a precursor composition including epoxyalkoxysilanes or a hydrolyzate thereof and a curing catalyst. Preferably the scratch resistant coatings contain at least one inorganic filler such as $SiO_2$ and/or metal oxides colloids. Examples of such compositions are disclosed in U.S. Pat. No. 4,211,823 (which is expressly incorporated by reference), WO 94/10230, and U.S. Pat. No. 5,015,523.

The most preferred scratch-resistant coating compositions are those comprising as the main constituents an epoxyalkoxysilane such as, for example, γ-glycidoxypropyltrimethoxysilane (GLYMO) and a dialkyldialkoxysilane such as, for example dimethyldiethoxysilane (DMDES), colloidal silica and a catalytic amount of a curing catalyst such as aluminum acetylacetonate or a hydrolyzate thereof, the remainder of the composition being essentially comprised of solvents typically used for formulating these compositions. Suitable scratch-resistant coating compositions also may contain a coupling agent as described above.

For certain of the present methods, because the surface being coated is untouched by abrasives that could otherwise be used to create an orientation prior to applying the polarized coating, any visual haze that is experienced by a user of such a polarized lens should be less severe than it would be with a polarized lens that was scratched in some manner prior to the application of the polarized coating. Shear flow of the polarizing liquid across the curved lens surface should also reduce edge-effects as compared to other coating methods.

Before applying a polarizing liquid to the lens by shear flow with a flexible apparatus 4, one option is to apply polarizing liquid by any conventional means over at least a first portion of curved surface 2, preferably the whole curved surface of the lens. Suitable conventional means for applying the polarizing liquid include dip coating, spray coating, flow coating and spin coating. This step of applying the polarizing liquid to a first portion of the curved surface of the lens may be implemented in a separate coating apparatus, such as a dip coating apparatus or a spin coating apparatus, before shear flow.

In embodiments where the polarizing liquid already has been applied by conventional means to the curved surface of the lens, or a portion of the curved surface, it is then not mandatory to apply the polarizing liquid on the flexible apparatus 4 or on the lens holder 12 between the flexible apparatus 4 and the lens 1. Once the polarizing liquid has been applied to the curved surface of the lens 1, and the lens 1 is placed in the lens holder 12, the sweeping of the flexible apparatus 4 across the lens 1 will induce the shear flow and the final orientation for obtaining the polarized coating.

A preferred embodiment of the method of the invention will now be described in connection with FIGS. 6 to 8.

Figure 6:
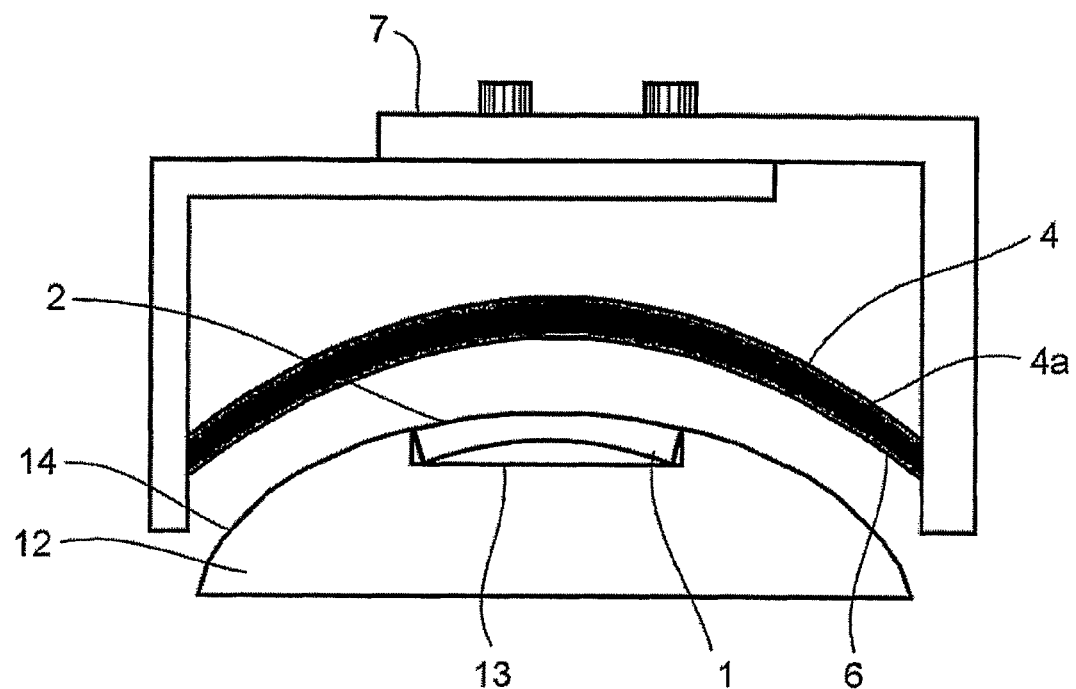
FIG. 6 is a side schematic view of a preferred embodiment of the present invention.

As shown in FIG. 6, a lens 1 is placed in an accommodating recess 13 of a lens holder 12 so that the convex surface 2 of the lens 1 is freely accessible.

The lens holder 12 has a curved surface 14 surrounding the lens convex surface 2 and having a curvature matching the curvature of the convex surface 2 of the lens, these forming a continuous curved surface therewith.

The flexible apparatus 4 comprises a flexible cylindrical core 4a on which is wound a wire 6. The flexible apparatus 4 is mounted in a holding jig 7 in a flexed manner to approximately match the curvature of the lens holder curved surface 14 and convex surface 2 of the lens 1.

Figure 7:
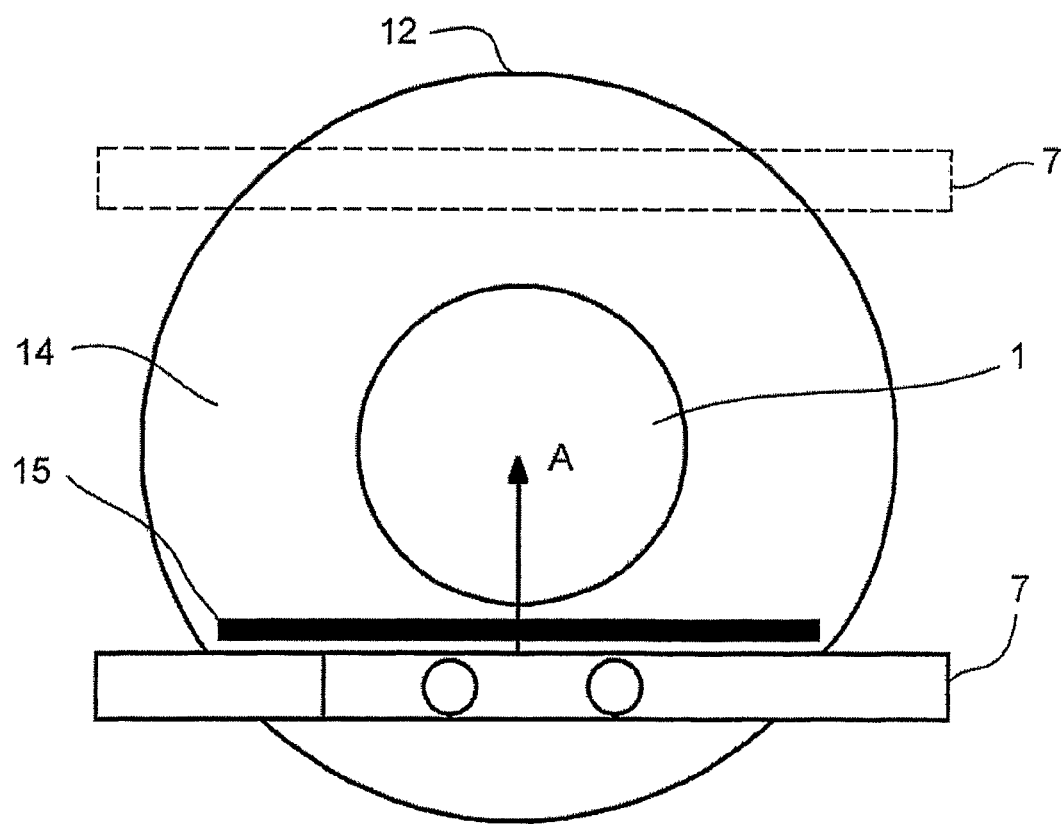
FIG. 7 is a top schematic view of the preferred embodiment of FIG. 6.

As shown in FIG. 7, a line of polarizing liquid 15 is deposited on the curved surface 14 of the lens holder 12 ahead from the lens 1.

The method is then implemented as follows:

The flexible apparatus 4 is applied into contact with the curved surface 14 of the lens holder 12 between the periphery of the lens holder 12 and the line of polarizing liquid 15 in such a manner that it conforms to the curvature of the lens holder curved surface 14 and applies a normal pressure force thereon.

Figure 8:
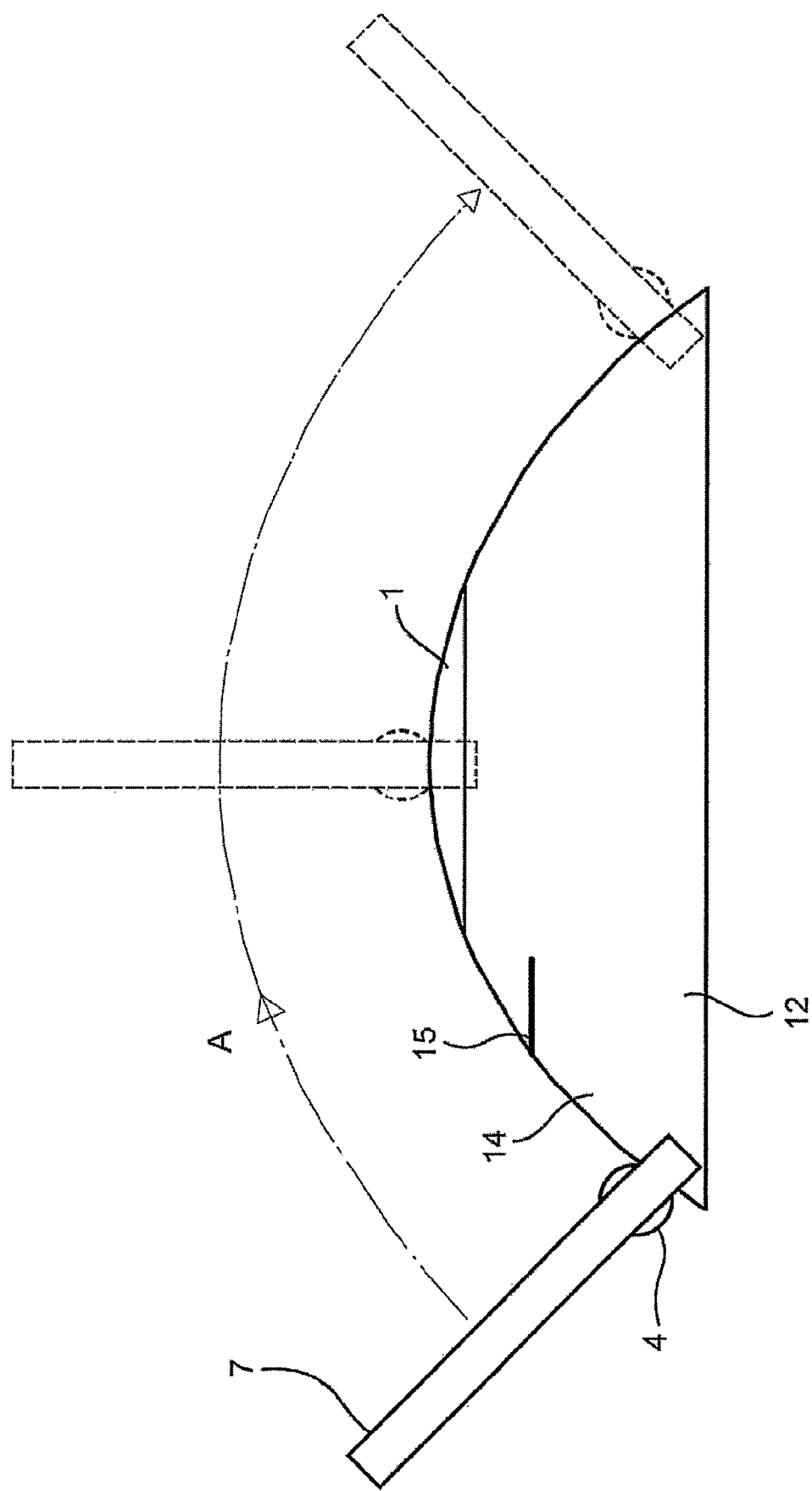
FIG. 8 is a schematic view showing the moving of the flexible apparatus according to the preferred embodiment of FIG. 6.

Then, as shown in FIGS. 7 and 8, the flexible apparatus 4 is moved, using jig 7, passed the line of polarizing liquid 15 and the lens 1 as shown by arrow A, while maintaining contact with the curved surface 14 of the lens holder 12 and the convex surface of the lens 1 and a pressure force substantially normal to the curved surfaces.

By a pressure force substantially normal to the curved surface it is meant a force which is substantially perpendicular to a plane tangent to the curved surfaces and passing by the contact point between the flexible apparatus 4 and the curved surface.

Of course, the polarizing liquid 15 may be deposited in other forms than a substantially straight line, and it can also be deposited on the lens convex surface 2, generally near the periphery thereof.

The following examples are included to demonstrate specific, non-limiting embodiments of the present methods. It should be appreciated by those of skill in the art that the techniques disclosed in the following examples represent techniques discovered by the inventors to function in the practice of certain methods of the invention, and thus constitute modes for its practice. However, those of skill in the art should, in light of this disclosure, appreciate that changes can be made to the techniques and materials of the following examples and still obtain like or similar results without departing from the scope of the invention.

EXAMPLES

Example 1

Materials and Methods

Flexible Apparatus:

In one embodiment of the invention, the flexible apparatus 4 can be made from plastic tubing material. Typical flexible apparatuses had a length of 170 mm of which 105 mm is wrapped with the wire 6. The tubing was wrapped with 100 micron diameter stainless steel Cobra cut Ø0, 10 mm wire from AGIECUT. The plastic tubing can be hard vacuum tubing or flexible "Tygon" tubing. The Tygon tubing used in this experiment had an overall diameter of 7 mm with a wall thickness of 1 mm. In preferred embodiments, the tubing was clear flexible tubing (tubing polyvinyl ¼OD×³⁄₁₆ID Parker #PV403-1).

Lens Holder:

The lens holder 12 used was a 6 base aluminized hollow half-sphere. The crown of the sphere was remove so that a 6-base piano ORMA® lens would form a smooth "flush" curve.

Dye Application:

To permit complete coverage of the lens, the lens was placed in a holder that had a curvature to match the radius of curvature of the lens. FIG. 5 shows a flexible apparatus 4 and a lens 1 in a lens holder 12. An aliquot (1-2 mL) of Optiva N015 ink was placed on the surface of the lens holder in a substantially straight line between the lens and the flexible rod. The flexible rod was applied on the lens holder and swept across the lens as described above in connection with FIG. 6 to 8. The sweep takes place in ~1-2 seconds. The ink was allowed to dry over 1-3 minutes in a humid atmosphere (70% RH). The lenses was then removed from the holder and the ink was fixed by a BaCl (10 wt %) aqueous solution. The lens can then be hardcoated as described previously. The samples in Table 1 did not possess a hardcoat.

Example 2

(Results)

| SAMPLE | DYE* | ALIGNMENT METHOD | CONTRAST RATIO |
|---|---|---|---|
| 1 | TCF N°15.05.115 from Optiva | Flexible rod | 30.64 |
| 2 | TCF N°15.05.115 from Optiva | Flexible rod | 36.08 |
| 3 | TCF N°15.05.115 from Optiva | Flexible rod | 25.06 |
| 4 | TCF N°15.05.115 from Optiva | Flexible rod | 44.63 |
| 5 | TCF N°15.05.115 from Optiva | Flexible rod | 36.99 |
| 6 | TCF N°15.05.115 Mechanical grade from Optiva | Flexible rod | 63.81 |
| 7 | TCF N°15.05.115 Mechanical grade from Optiva | Flexible rod | 71.44 |
| 8 | TCF N°15.05.115 Mechanical grade from Optiva | Flexible rod | 72.24 |
| 9 | TCF N°15.05.115 Mechanical grade from Optiva | Flexible rod | 51.62 |
| 10 | TCF N°15.05.115 Mechanical grade from Optiva | Flexible rod | 66.65 |

TCF N°15.05.115 and TCF N°15.05.115 Mechanical grade are dye solutions (11.5%) of 3 dyes in water.

The contrast ratio is the ratio of luminous transmittance between parallel and perpendicular positions. The transmission measurements were performed on a Lamda 900 spectrometer in a spectral range of 380-780 nm using a reference polarizer in the beam path. The photopic response was calculated based upon the full spectral scan. The perpendicular position was found by rotating the lens with respect to the reference polarizer until a minimum transmission was observed at 550 nm. A full spectral scan was performed at this position and upon rotating the lens 90 degrees.

It should be understood that the present methods and apparatuses are not intended to be limited to the particular forms disclosed. Rather, they are to cover all modifications, equivalents, and alternatives falling within the scope of the claims. For example, while polarized coatings having contrast ratios of about 25 and higher have been described, suitable polarized coatings formed according to the present methods may have contrast ratios as low as 8 (according to ISO 8980-3). The claims are not to be interpreted as including means-plus- or step-plus-function limitations, unless such a limitation is explicitly recited in a given claim using the phrase(s) "means for" or "step for," respectively.

REFERENCES

The following references, to the extent that they provide exemplary procedural or other details supplementary to those set forth herein, are specifically incorporated herein by reference.

U.S. Pat. No. 2,400,877
U.S. Pat. No. 4,211,823
U.S. Pat. No. 4,648,925
U.S. Pat. No. 4,683,153
U.S. Pat. No. 4,865,668
U.S. Pat. No. 4,977,028
U.S. Pat. No. 5,015,523
U.S. Pat. No. 5,316,791
U.S. Pat. No. 5,739,296
U.S. Pat. No. 6,049,428
U.S. Pat. No. 6,174,394
U.S. Pat. No. 6,245,399
PCT Appln. WO 94/10230
Japanese Pat. 63-141001
Japanese Pat. 63-87223
European Pat. 0 404 111

The invention claimed is:

1. A method for forming a polarizing coating on a curved surface of an ophthalmic lens comprising:
   a) providing an ophthalmic lens having a curved surface, wherein said ophthalmic lens is placed in a holder such that the curved surface of the ophthalmic lens is freely accessible, wherein said holder comprises a curved external surface surrounding the ophthalmic lens curved surface;
   b) providing a flexible apparatus;
   c) depositing a polarizing liquid on an area of the ophthalmic lens curved surface, on the flexible apparatus, or on the external surface of the holder;
   d) applying the flexible apparatus on the curved surface of the ophthalmic lens so that the flexible apparatus matches the curvature of the ophthalmic lens curved surface, the flexible apparatus being flexed to substantially match the curvature of the ophthalmic lens prior to step (d);
   e) moving the flexible apparatus past the deposited polarizing liquid and the ophthalmic lens, whereby a film of the polarizing liquid is formed by shear flow on the ophthalmic lens curved surface, wherein a pressure force substantially normal to the ophthalmic lens curved surface is applied during moving step (e);
   f) drying the film of polarized liquid to form a polarizing coating; and
   g) recovering the ophthalmic lens having a curved surface with a polarized coating thereon.

2. The method of claim 1, wherein the polarizing liquid is disposed on the curved surface prior to shear flow.

3. The method of claim 1, wherein the polarizing liquid is disposed on the flexible apparatus prior to shear flow.

4. The method of claim 3, wherein the polarizing liquid is disposed on the periphery of the flexible apparatus.

5. The method of claim 1, wherein the polarizing liquid of step c) is deposited on an area of the holder external surface.

6. The method of claim 5, wherein the polarizing liquid is disposed on the holder between the ophthalmic lens and the flexible apparatus prior to shear flow.

7. The method of claim 6, wherein the polarizing liquid is disposed in a substantially straight line.

8. The method of claim 1 wherein the flexible apparatus is applied during step d) on the holder external surface between its periphery and the deposited polarizing liquid.

9. The method of claim 1, wherein the holder external curved surface has the same curvature as the ophthalmic lens curved surface.

10. The method of claim 1, wherein the flexible apparatus is configured to be attached to a holder apparatus.

11. The method of claim 1, wherein the shear flow is linear shear flow.

12. The method of claim 1, wherein the flexible apparatus is a flexible rod.

13. The method of claim 12, wherein the flexible rod is biased to apply a pressure force substantially normal to the holder external surface and ophthalmic lens curved surfaces during entire moving step (e).

14. The method of claim 12, wherein the flexible rod is preformed to an accurate shape prior to application step (d) of the flexible rod on the holder external surface.

15. The method of claim 12, wherein the flexible rod has an external surface provided with a plurality of circumferentially spaced grooves.

16. The method of claim 12, wherein the flexible rod comprises a flexible core having a wire wrapped around.

17. The method of claim 1, wherein the flexible apparatus comprises a circular, rectangular, or spherical portion.

18. The method of claim 1, wherein a material is wrapped around the flexible apparatus.

19. The method of claim 18, wherein the material is a wire.

20. The method of claim 1, wherein the flexible apparatus comprises a groove.

21. The method of claim 1, wherein the flexible apparatus comprises etching.

22. The method of claim 1, wherein the flexible apparatus comprises a substantially smooth surface.

23. The method of claim 1, wherein the flexible apparatus is rotatable.

24. The method of claim 1, wherein the flexible apparatus is not rotatable.

25. The method of claim 1, where the curved surface has not been treated to create an orientation prior to the coating.

26. The method of claim 1, where the ophthalmic lens is coated with a material prior to the rotating.

27. The method of claim 26, where the material is an adhesion primer layer.

28. The method of claim 27, where the adhesion primer layer comprises a coupling agent.

29. The method of claim 1, wherein the ophthalmic lens curved surface is a convex surface.

30. The method of claim 1, further comprising adjusting a dye in the polarizing liquid to customize a color of the polarized coating.

31. The method of claim 1, wherein the polarized coating has a contrast ratio of at least 8.

32. The method of claim 1, where the polarized coating has a contrast ratio of at least 30.

33. The method of claim 1, where the polarized coating has a contrast ratio of at least 50.

34. The method of claim 1, where the polarized coating includes lyotropic liquid crystal material.

35. The method of claim 1, where the surface has not been treated to create an orientation prior to the shear flow.

36. The method of claim 1, where the curved surface of the ophthalmic lens is a convex surface and the ophthalmic lens has a concave surface substantially opposite the convex surface.

37. The method of claim 36, where the lens further comprises one or more layers disposed on the convex surface.

* * * * *